United States Patent
Momot et al.

(10) Patent No.: US 10,606,965 B2
(45) Date of Patent: *Mar. 31, 2020

(54) SYSTEM AND METHOD FOR EMULATION OF UNPRIVILEGED CODE IN A SIMULATED ENVIRONMENT

(71) Applicant: Leviathan Security Group, Inc., Seattle, WA (US)

(72) Inventors: Falcon Momot, Seattle, WA (US); Mikhail Davidov, Seattle, WA (US); Patrick Stach, The Woodlands, TX (US); Darren Kemp, Calgary (CA)

(73) Assignee: LEVIATHAN SECURITY GROUP, INC., Seattle, WA (US)

( * ) Notice: Subject to any disclaimer, the term of this patent is extended or adjusted under 35 U.S.C. 154(b) by 690 days.

This patent is subject to a terminal disclaimer.

(21) Appl. No.: 14/804,023

(22) Filed: Jul. 20, 2015

(65) Prior Publication Data
US 2016/0196368 A1 Jul. 7, 2016

Related U.S. Application Data

(60) Provisional application No. 62/026,427, filed on Jul. 18, 2014.

(51) Int. Cl.
*G06F 17/50* (2006.01)
*H04L 29/06* (2006.01)

(52) U.S. Cl.
CPC .......... *G06F 17/5009* (2013.01); *H04L 63/14* (2013.01); *H04L 63/1416* (2013.01); *H04L 63/1425* (2013.01); *H04L 63/1441* (2013.01)

(58) Field of Classification Search
CPC . G06F 17/5009; H04L 63/1441; H04L 63/14; H04L 63/1416; H04L 63/1425
See application file for complete search history.

(56) References Cited

U.S. PATENT DOCUMENTS

| | | | |
|---|---|---|---|
| 2003/0037237 A1* | 2/2003 | Abgrall | G06F 21/53 713/166 |
| 2005/0154900 A1* | 7/2005 | Muttik | G06F 21/55 713/188 |

OTHER PUBLICATIONS

GitHub, "Libemu Shellcode Emulation", Oct. 8, 2015, 9 pages.
"Shellcode Detection and Emulation with Libemu", Posted in General Security on Jul. 29, 2014, 25 pages.

* cited by examiner

*Primary Examiner* — Dwin M Craig
(74) *Attorney, Agent, or Firm* — Vernon W. Francissen (57) ABSTRACT

A system, method and media are shown for emulating potentially malicious code involving emulating a first ring of an operating system, emulating a second ring of the operating system, where the second ring has greater access to system resources than the first ring and where the first and second rings are separately emulated, executing a code payload in the emulated first ring, checking the behavior of the executing code payload for suspect behavior, and identifying the code payload as malicious code if suspect behavior is detected. Some examples emulate the second ring by operating system or microarchitecture functionality such that the second ring emulation returns results to the executing code payload, but does not actually perform the functionality in a host platform. Some examples execute the code payload in the emulated first shell at one or more offsets.

21 Claims, 5 Drawing Sheets

SYSTEM AND METHOD FOR EMULATION OF UNPRIVILEGED CODE IN A SIMULATED ENVIRONMENT

CROSS REFERENCE TO RELATED APPLICATIONS

This application claims the benefit of U.S. Provisional Patent Appl. No. 62/026,427 for "System and Method for Emulation of Unprivileged Code in a Simulated Environment" filed Jul. 18, 2014, herein incorporated by reference in its entirety for all purposes.

GOVERNMENT LICENSE RIGHTS

This invention was made with government support under FA8750-12-C-0161 awarded by the United States Air Force. The government has certain rights in the invention.

BACKGROUND

Computer networks and the devices and services that reside on them are often the subject of attacks by parties that are attempting to improperly access information and resources or to introduce malicious code to the networks. One type of attack is based on return oriented programming (ROP), wherein attackers link together short runs of code already present in a program's address space in order to gain control of programs without relying on code injection.

SUMMARY

Examples of systems, methods and media are shown for emulating potentially malicious code involves emulating first and second rings of an operating system, where the second ring has greater access to system resources than the first ring and where the first and second rings are separately emulated. The method calls for executing a code payload in the emulated first ring, checking the behavior of the executing code payload for suspect behavior, and identifying the code payload as malicious code of suspect behavior is detected.

In one refinement, emulating a second ring of the operating system further involves emulating an operating system or microarchitecture functionality such that the second ring emulation returns results to the executing code payload, but does not actually perform the functionality in a host platform.

In another refinement, executing a code payload in the emulated first shell further involves executing the code payload in the emulated first shell at one or more offsets.

In still another refinement, checking the behavior of the executing code payload for suspect behavior further involves determining the suspect behavior dynamically, parametrically, or statically or a combination of these.

In yet another refinement, the suspect behavior includes any one or a combination of invocation of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, or execution of code matching one of a set of signatures. In a further refinement, the suspect behavior is defined by dynamically, parametrically, or statically or a combination thereof.

Another example for emulating potentially malicious code in accordance with certain aspects of the present invention involves emulating that code under observation. However, since running malicious code is undesirable, the method emulates the operating system and other aspects of the environment in which the code runs. In one embodiment, the potentially malicious code is emulated in a virtual machine, but any calls to the operating system, interrupts, or like mechanisms are emulated by a separate layer which does not perform them, but instead merely observes them, discards them, and returns an expected return value to the potentially malicious code in order to facilitate its continued execution. The method calls for instrumenting both layers of emulation, checking the behavior of the potentially malicious code, and identifying whether or not it in fact appears to be malicious code.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
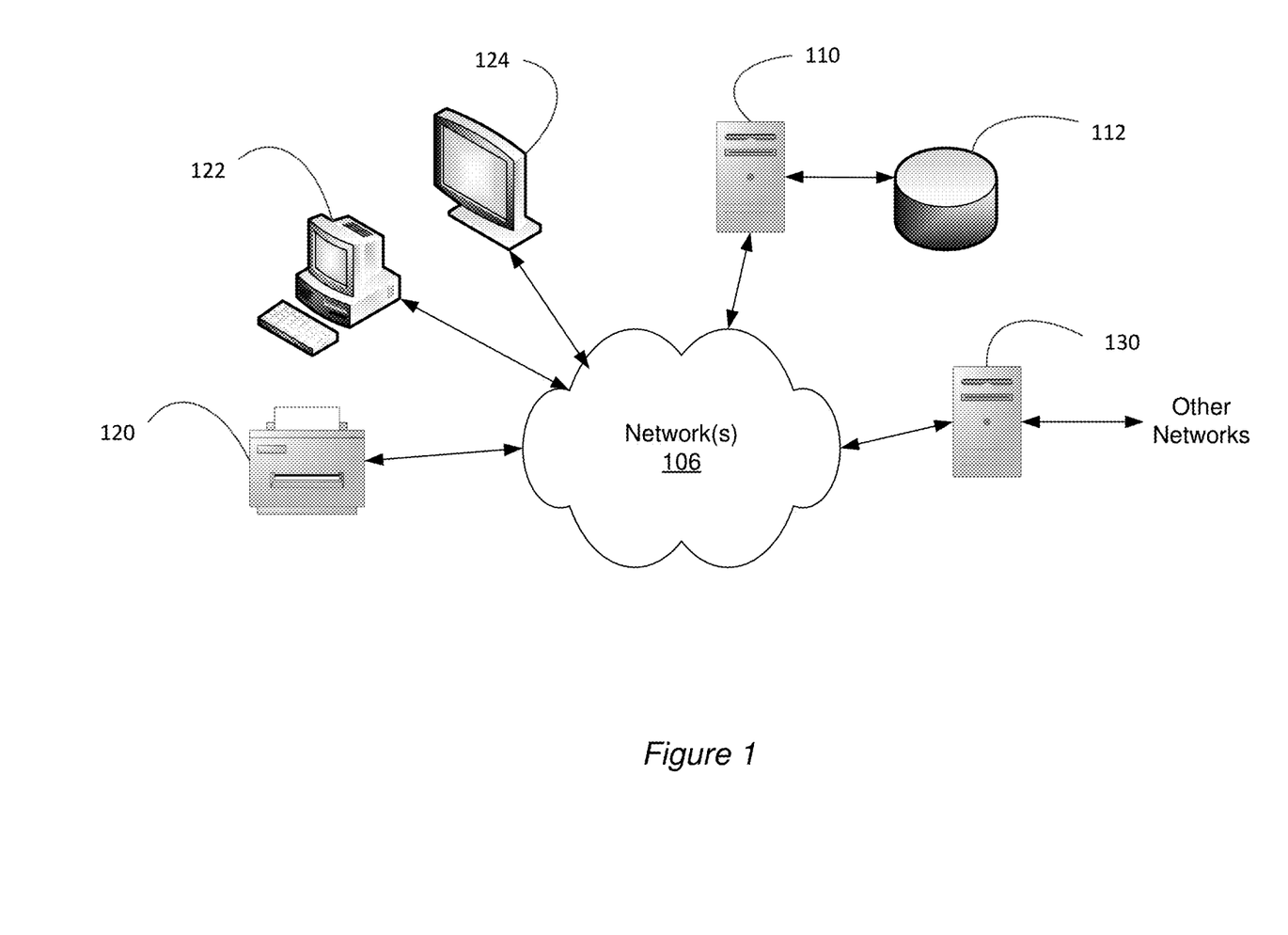
FIG. 1 is a schematic diagram depicting an example of a computer network based system that may be subject to attack and may be suitable for utilization of certain aspects of the present invention.

FIG. 1 is an architecture diagram that depicts aspects of an example of a computer network system with communication among multiple devices. In this example, network 106, which can be one network or multiple networks, provides communication between server 110 connected to database 112 and several client devices, such as printer 120, personal computer 122, and interactive terminal 124. The architecture of FIG. 1 is a simplified representation of an enterprise environment having a multitude of different computing devices that may represent a target for an attack. A gateway 130 provides a communications link between the network 106 and other networks, such as the internet, through which an attacker may launch an attack.

Computer operating systems provide different privilege levels of access to resources typically arranged in a hierarchy. One way to view these privilege levels is as a series of concentric rings or shells with the level with the most privileges at the center and successive levels of rings with lower levels of privilege surrounding it. For example, in an x86 architecture, Ring 0 is the level with the most privileges and interacts most directly with the physical hardware such as the CPU and memory. Ring 3 is the level with the lowest level of privileges and is generally user code. While there are multiple levels of privilege, in practice only Ring 0 (kernel) and Ring 3 (user) are typically used.

The distinctions between rings, i.e. privilege levels, is enforced and assisted to a large extent by the processor and in part by x86 segment privilege levels. Interfaces between rings are provided to allow an outer ring to access an inner ring's resources in a predefined manner, as opposed to allowing arbitrary usage. Correctly gating access between rings can improve security by preventing programs from one ring or privilege level from misusing resources intended for programs in another. For example, a user program operating in Ring 3 is prevented from turning on a web camera without informing the user, since hardware access should be a Ring 1 function reserved for device drivers. Programs such as web browsers running in higher numbered rings must request access to the network, a resource restricted to a lower numbered ring.

The behavior of the environment in which Ring 3 code runs is controlled in part by the Ring 0 code, which defines the action of most software interrupts, system call instructions, segmentation (including which segment selectors are designated for which purpose), and certain capabilities such as unaligned memory accesses and the ability to execute certain instructions.

Figure 2:
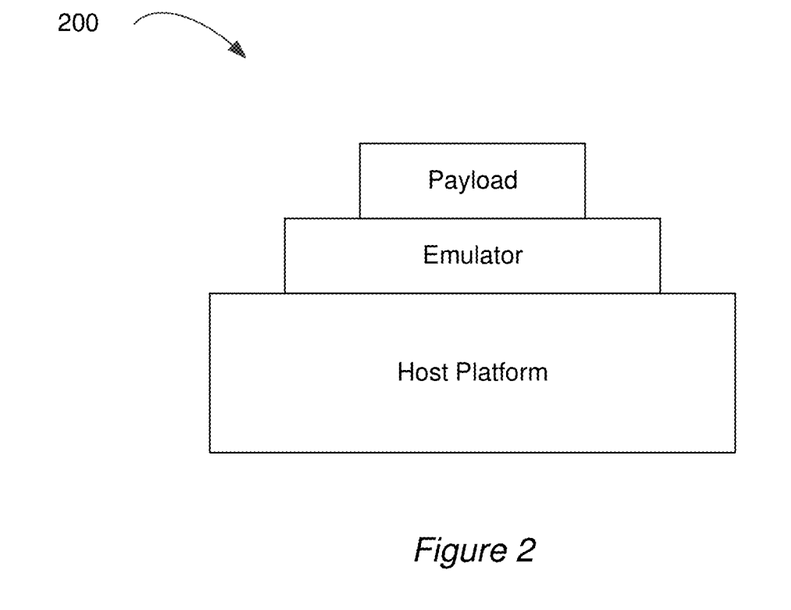
FIG. 2 is a functional block diagram illustrating a simplified example of the structure of conventional emulation.
Figure 3:
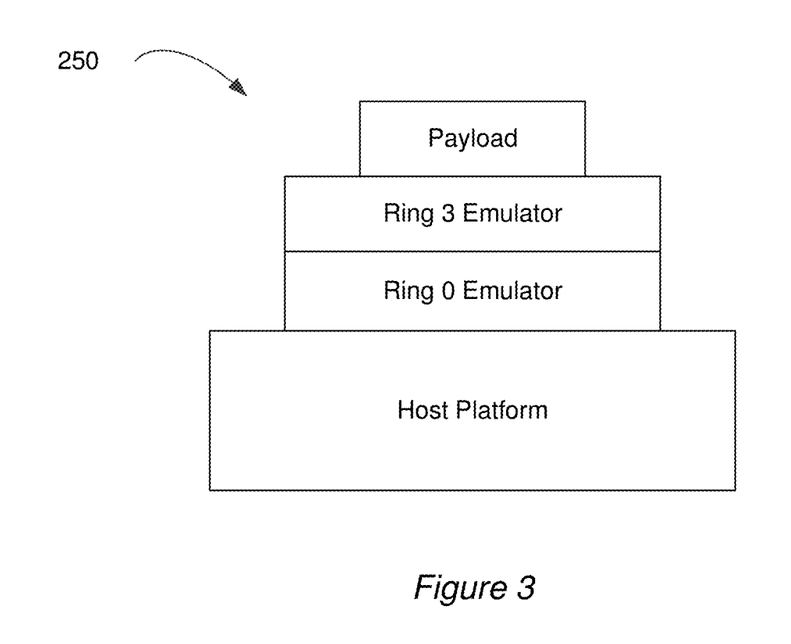
FIG. 3 is a functional block diagram illustrating a simplified example of the structure of emulation in accordance with certain aspects of the present invention.

FIG. 2 is a functional block diagram illustrating a simplified example of the structure of conventional emulation, wherein an emulator program runs on a host platform and payload code runs on the emulator program, which provides emulates both Ring 0 and Ring 3 functionality or relies on the actual host platform to provide Ring 0 functionality. FIG. 3 is another functional block diagram illustrating a simplified example of the structure of emulation in accordance with certain aspects of the present invention, wherein Ring 3 emulation is performed separately from Ring 0 emulation, such that Ring 0 responses are provided to the Ring 3 emulator from the Ring 0 emulator rather than the host platform. The payload interacts with the Ring 3 emulator as if it's a normal Ring 3 shell. Because Ring 0 functionality is separately emulated, the payload may be allowed to execute freely in order to observe its behavior without risk to the host platform and it is more difficult for the payload to detect that it's running in an emulated environment.

An emulator is software, hardware or a combination of both that emulates or imitates another program or device. For example, an emulator program may enable a host operating system, e.g. the Mac OS, to emulate another operating system, e.g. Windows, and thereby permit application programs written for emulated platform to execute on the host platform. The emulator duplicates the functions of the emulated platform on the host platform to present a virtual machine that exhibits the behavior of the emulated platform. To an application program, the virtual machine executing on the host platform appears as the emulated platform. The emulator allows the user to have access to any kind of application or operating system on a current platform, while the software runs as it did in its original environment. Many emulators emulate Ring 0 code to enable other programs, such as applications, to operate. Other emulators mimic a microarchitecture.

One example of emulation in accordance with certain aspects of the present invention is running executable code in a way that allows it to make use of operating system functionality to a limited extent without any operating system code being emulated in the same context as the code under emulation, based upon a directory of the behavior of the operating system under emulation, without effecting the intent of the operating system functionality. In essence, the code under emulation is unable to accomplish its intended purpose while still being able to execute, by emulating certain operating system and microarchitecture functionality in such a way that it returns the expected results to the code under emulation, but does not actually perform the task it would be expected to perform outside the emulator. In one embodiment in accordance with certain aspects of the present invention, the privileged (Ring 0) emulation functions will internally persist such effects of the otherwise discarded requests made of it by the code running in the unprivileged emulator as would be persisted in a non-emulated environment and, to the greatest extent possible, modify its behavior accordingly in order to simulate the actual persistence of the effects of the requests.

An embodiment of an emulator in accordance with certain aspects of the present invention emulates both the microarchitecture and the Ring 3 code, while maintaining a separation between them. The emulator implements the Ring 0 code, e.g. returning appropriate behavior for the Ring 3 code under emulation, and separately emulates the Ring 3 code, providing for a microarchitecture or processor mode different from or the same as that on which the emulator is running, e.g. x86 IA-32e compatibility mode on an Intel 64 processor running in 64-bit mode. Because of this, the emulator is able to conduct dynamic analysis on the running code and report on its behavior as opposed to simply allowing the code under emulation to perform the purpose for which it was intended. Certain examples adapt the emulation process to analysis of crashes resulting from attempts to inject malicious payloads into software. Other examples adapt the emulation process to find malicious payloads in arbitrary data or apply instrumentation to an already isolated payload to permit the payload to be studied.

Another example in accordance with the present invention involves running the code from a variety of different offsets, for example, each address residing in a read/write page of memory, which is a page type that is more likely to contain malicious payloads than other page types. While few of these offsets would make an effective entry point for a program, and, in fact, none of them may be the canonical entry point, it is likely that if a malicious payload exists, one of the offsets will be its starting address, which will trigger execution of the malicious payload so that its behavior may be detected and analyzed. In essence, emulating parts of a process image that are likely to be useful to attackers, rather than those parts which are likely to be code, without reference to the entry points in the code for the process.

In another example in accordance with the present invention, emulation is started from a later offset than the program entry in order to bypass anti-emulator loops embedded in malicious payloads. In still another example, an instruction count limit is utilized in the emulator to ensure that analysis will, at some point, complete without a need to solve the halting problem.

Certain embodiments of the present invention are able to detect malicious payloads that were not successfully executed despite being successfully introduced into process memory. In order to exploit arbitrary code execution vulnerabilities in software, an attacker first introduces the payload into process memory, and then "hijacks" or takes control of the instruction pointer such that it points to the beginning of the payload. Introducing the payload is less likely to fail than taking control of the instruction pointer since many programs are designed to load arbitrary data into memory. The control step will fail for such reasons as the wrong offset being jumped to, or a protection against this operation which exists in the program being exploited. If this happens, the malicious payload is not reachable through the normal program blockgraph from the original execution entry point and certain embodiments of the present invention emulate from other offsets to find the payload.

An aspect of certain embodiments of the present invention involves executing arbitrary code in an emulator that detects and reports on certain behavior, such as malicious code-like activity, including the invocation of certain operating system behavior, the execution of certain instructions or sequences of instructions, and accesses to certain memory addresses, whether individually or in aggregate, all of which may be defined dynamically, parametrically, or statically. In one example, the emulation keeps the code under emulation executing as long as reasonable from each offset, while implementing any self-contained functionality in the code, e.g. decrypting or self-mutating operations, without completely executing it. The associated thresholds may be static or dynamic. Instrumentation is then used to check for behavior that is valid yet unlikely to be found in legitimate code, such as sequences of instructions whose effect is to load the value of the instruction pointer into a general purpose register or to detect whether the code is running in an emulator.

One aspect of certain embodiments of the present invention is detecting the intended invocation of undefined processor behavior and reporting on its occurrence. Some embodiments of the present invention have properties similar to a signature-based malicious code detection engine, except that these embodiments are able to use a discrete set of signatures, which are lists of behaviors rather than of sequences, and remove the need to pre-compute the results of the malicious code's decoders. These signatures may vary under changes to the microarchitecture as new processor functionality is implemented or removed, and vary as major changes in computer network exploitation methodology change the nature of which behaviors are suspicious, but are generally invariant across modifications to existing malicious code or the creation of new malicious code using extant exploit techniques. Rather, the decoder present in the malicious code is itself used, if one exists, so that it is not necessary to recognize them or keep an updated list. In other words, instead of trying to merely match malicious code behavior, certain embodiments detect that malicious actions were attempted directly. Certain components of the execution environment, such as userland parts of exception handling, can be executed in this way to also improve detection.

Some embodiments of the present invention are able to detect when the instruction pointer has moved into a range of addresses that is suspicious, such as ranges not normally executed in the vulnerable programs blockgraph. This range may be configured, precomputed, or a combination of configured and computed. The range of suspect addresses may include addresses that should never be executed, such as the program stack, and addresses that are known to be typically used in malicious code, e.g. 0x41414141. Other external heuristics may be applied to determine the set of suspicious address ranges.

Because the malicious code is not running in a real environment, sandboxing may not be needed. System calls are emulated, but their effect on the system is not. Therefore the malicious code running within the emulator is unable to communicate with other systems or processes, and the malicious code doesn't achieve persistence, unless there is a vulnerability in the emulator implementation that would allow control to be taken of the host system, which is the same risk as in any other application. The emulation of the present invention does not represent an elevated risk of compromise even though it concentrates malicious data.

Note that the malicious code is unlikely to be entirely executed. It is inferred that malicious code was injected into the process under analysis and that an attempt was made to branch execution in a suspicious way. The mechanisms of persistence of the exploit and the intention of the exploit are not necessarily analyzed. Generally, it is the techniques used in the initial part of the payload, which gains control of execution and starts the components that conduct malicious computation or achieve persistence, that are analyzed. However, once the presence and location of malicious code are confirmed through certain embodiments of the present invention, other tools may be used to analyze the exact end-to-end effects without emulation.

Figure 4:
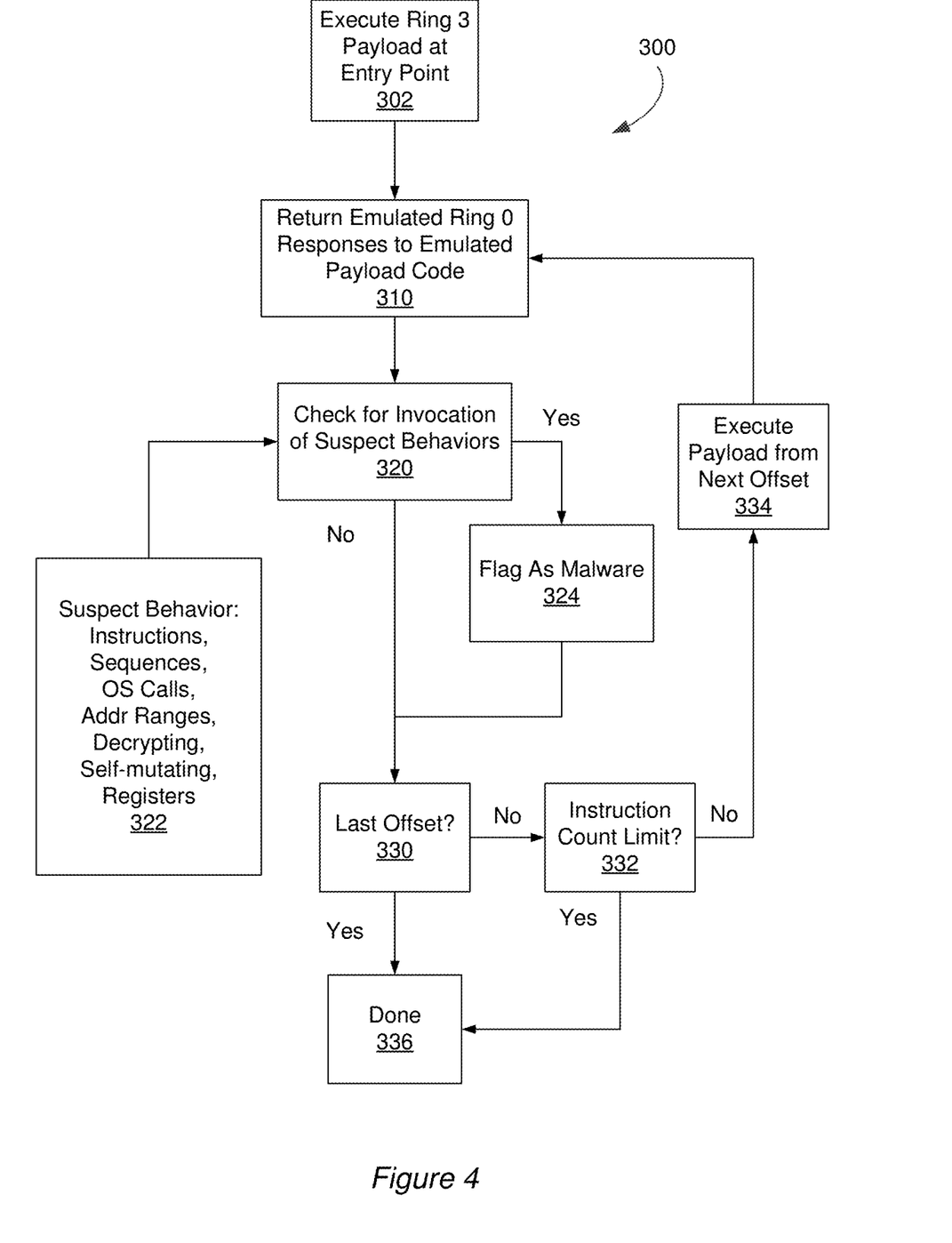
FIG. 4 is a control flow diagram illustrating an example of an emulation process in accordance with some aspects of the present invention.

FIG. 4 is a control flow diagram illustrating an example of an emulation process 300 for in accordance with certain aspects of the present invention. In this example, at step 302, the payload is executed in a Ring 3 emulator starting at a normal entry point for the payload code. At step 310, calls to Ring 0 functionality from Ring 3 cause the Ring 0 functionality to be emulated and the emulated response returned to Ring 3. In this manner, Ring 0 and Ring 3 functionality is emulated separately. This may involve emulating certain operating system and microarchitecture functionality in such a way that the Ring 0 emulation returns the expected results to the payload code under emulation, but does not actually perform the task it would be expected to perform outside the emulator in the host platform. Emulation of events that are dependent upon unknown or unknowable circumstances, e.g. reads from disk or device drivers where context is unavailable or a capture of that context is unimplemented, may be simulated by providing random or static data, though at a cost to the accuracy and completeness of the emulation.

At step 320, the behavior of the payload code as it is executed in Ring 3 emulation is examined for suspect behavior associated with malicious code. The suspect behavior may be defined dynamically, parametrically, or statically by, for example, a detection engine at step 322. Suspect behavior includes, for example, invocation of certain operating system behavior, execution of certain instructions or sequences of instructions, and accesses to certain memory addresses, self-contained functionality in the code, e.g. decrypting or self-mutating operations, sequences of instructions whose effect is to load the value of the instruction pointer into a general purpose register or to detect whether the code is running in an emulator. The detection engine may also use a discrete set of signatures, which are lists of behaviors rather than of sequences and may be checked, for example, initially and when self-modifying code is found to mutate. Further, the engine may detect when the instruction pointer has moved into a range of addresses that is suspicious, such as ranges not normally executed in the vulnerable programs blockgraph. This range may be configured, precomputed, or a combination of configured and computed. The range of suspect addresses may include addresses that should never be executed, such as the program stack, and addresses that are known to be typically used in malicious code, e.g. 0x41414141. Other external heuristics may be applied to determine the set of suspicious address ranges.

If suspect behavior is detected at step 320, then the payload code is flagged as potential malicious code at step 324. Step 324 may include providing data on the behavior of the executed malicious payload, such as address of the code, the type of behavior detected, and dynamically generated process data. In this embodiment, control branches to step 330 for further emulation. Alternative embodiments may terminate emulation once the malicious code is detected.

At step 330, a check is performed to determine whether other offsets exist that may be emulated and control flows to step 334 to execute the payload code from the next offset and branch to step 310 for continued emulation. In this example, the emulation process runs the payload code from a variety of different offsets without reference to the entry points in the code for the process, such as each address residing in a read/write page of memory to attempt to trigger execution of malicious code within the payload so that its behavior may be detected and analyzed. For example, a set of malicious code that is preceded by a branch instruction that branches past the malicious code may keep the malicious code hidden. Emulating from each address in read/write memory will eventually begin executing at the beginning of the malicious code, which will trigger execution of the code.

If no additional offsets are to be run, then emulation terminates at step 336. If there are additional offsets, but the number of executed instructions from the payload has reached an instruction count limit, then emulation also terminates in order to avoid the halting problem.

Figure 5:
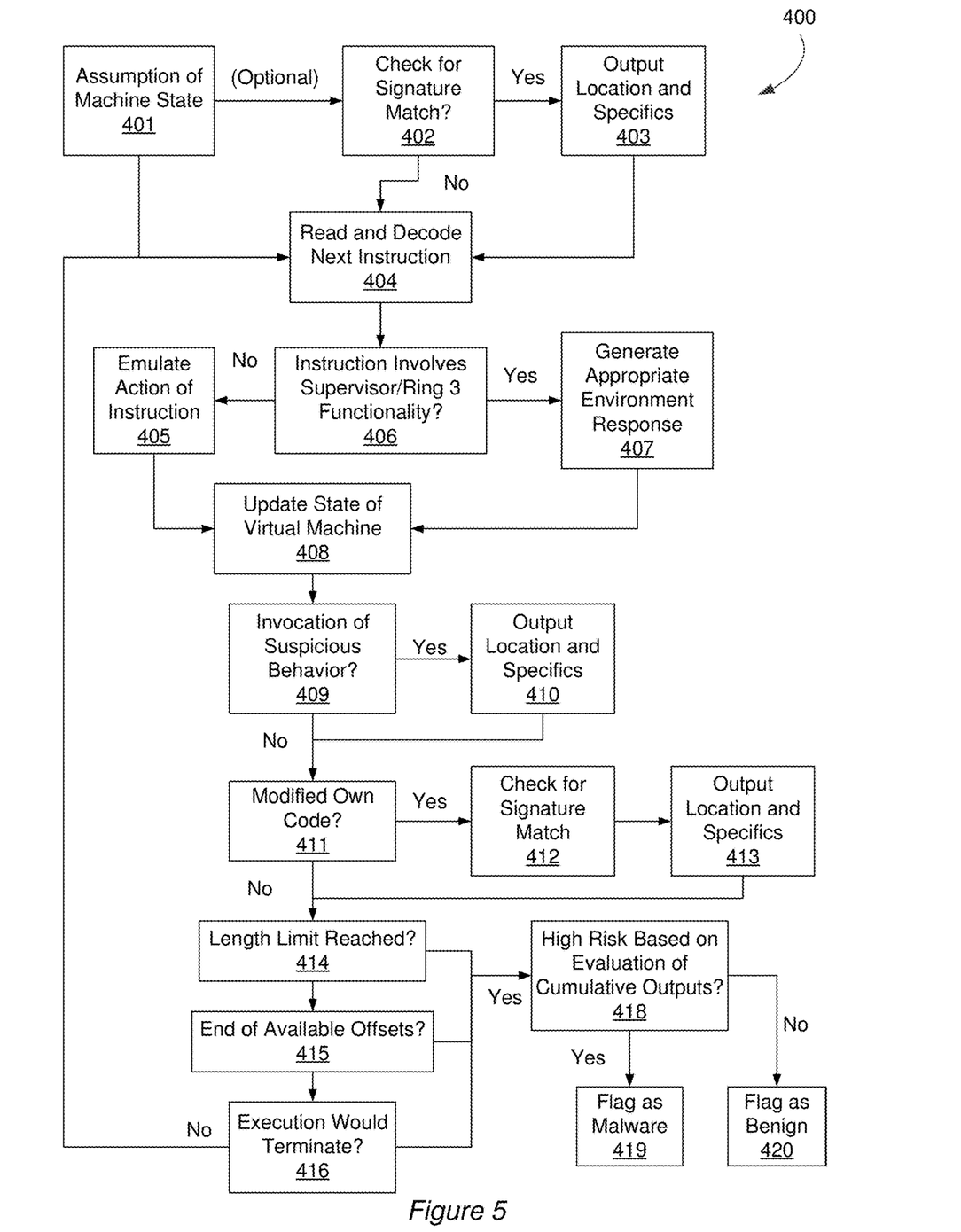
FIG. 5 is a control flow diagram illustrating another example of an emulation process in accordance with some aspects of the present invention.

FIG. 5 is a control flow diagram illustrating another example of an emulation process 400 for in accordance with certain aspects of the present invention. In this example, emulation begins at step 401 with the assumption of machine state, typically acquired from a snapshot of machine state present in a failure artifact or like form. Machine state generally includes at least working registers (i.e. on x86, EAX, ECX, EBX, EDX, ESP, ESI, EDI, EBP, and possibly others including coprocessor and debug registers, but not necessarily system management registers) and memory state. State which is not present may be assumed by other means including random generation and initialization to constant values. Accuracy is improved through the use of accurate state. A value for the instruction pointer is also assumed, though this value is typically not derived from the snapshot of state, but rather is set according to an emulation plan. Optionally, method 400 may include step 402, where the entirety of the memory image is checked against a signature database for the presence of sequence-matchable malicious code. If any malicious code signature match is found, then, step 403 reports one or more signatures that matched and may include the identity of the signature and the offset at which the match began.

From step 401, or optionally steps 402 and 403, process 400 continues by reading and decoding the instruction at the offset of the virtual instruction pointer (step 404). Step 404 also increments the count of executed instructions by one. The instruction and its operands are interpreted and whether the instruction is valid or not, the semantics and identity of the instruction, and the constraints on its operands are identified. Operands from the environment (i.e. memory operands) are checked as to validity and loaded if valid. If the instruction is not valid in the context in which it appears (e.g. privileged instruction in non-privileged code, invalid instruction, invalid operands, etc.), the resultant exception is handled in the way the system being emulated is known to handle it, possibly relying upon gathered state where this affects the handling in a manner similar to step 407. Execution may immediately terminate or may be branched to some location in the code, such as 417 or 408.

In the event that instruction decoding was successful at step 404, control flows to step 406 for a determination of whether the instruction would invoke supervisor or ring 0-2 behaviours (including exception handlers, system calls, interrupts, etc.), or not. If it would, control branches to step 407 to generate an appropriate response for the current environment for the emulated virtual machine, e.g. by looking up or computing the appropriate response and change in state for the given environment under emulation. If not, control branches to step 405 to emulate the action of the instruction by, for example, directly computing the effect of the instruction upon the state.

In either case, the state of the virtual machine is updated at step 408, committing register and memory updates, environment updates, and incrementing the instruction pointer to the next instruction. If the instruction branched execution (not pictured but basically a sub-step of 308), the instruction pointer is updated to the branch destination address.

Control branches from step 408 to a series of checks as to whether malicious activity is occurring are performed. Step 409 checks whether the instruction matched a defined pattern of behavior that is more likely to be part of attack code than legitimate code. Examples of such behavior include loading the current value of the instruction pointer into a register, branching execution to the stack or the heap or some other restricted range derived by external means, or executing instructions with the apparent purpose of detecting the presence of a virtualization environment, such as by checking undefined or commonly erroneously implemented behaviors or by using documented means to make that determination. If such is found at step 409, control branches to step 410 to output the location and specifics the suspicious behavior, e.g. identify the type of behavior and the address at which it occurred. In either case, control flows to step 411 to check whether the instruction modified its own code. If it has, then control flows to step 412 and then 413, if the signature-matching associated with step 402 is being used, to check the signature database again or, if the signature matching option is not employed, directly to step 413, to report the location and specifics for the self-modifying instruction, such as the location of the self-modifying code, and the code which modified it, as well as any matched signatures from step 412. Step 412 is substantially similar to step 402. Both steps 410 and 413, upon finding something to report, increment or multiply the maximum instructions to execute by a configurable amount or factor.

Whether or not the code was self-modifying (i.e. continuing from step 411 or 413), the number of instructions executed (as recorded in step 404) is compared against an arbitrary maximum length limit (specified, and modified by steps 410 and 413 or in a refinement) is checked at step 414. If this limit is reached, emulation proceeds no further and control branches to step 418. If it is not, then control branches to step 415 for a determination of whether the offset at which the instruction pointer now points is populated with additional instructions from the state snapshot. If emulation has reached the end of available offsets, control branches to step 418. If there are more available offsets, control branches to step 416 for a determination of whether the result of the last-executed instruction is termination. If emulation would terminate, then control branches to step 418. Otherwise, control branches from step 416 to step 404 to reach and decode the next instruction and continue emulation.

In this example, once emulation has stopped proceeding, control flows to step 418 where the cumulative risk factor is evaluated against an arbitrary threshold. The risk factor, in this example, is an additive factor composed of unique identified elements of attack code multiplied by weights. In one alternative embodiment, the appearance of defined combinations of identified risks may be treated differently (either more or less suspicious) than the treatment of those risk factors individually, or the number and relative locations of these may modify the weighting of each or any factor or combination of factors in step 418. If the risk factor threshold is exceeded, then, in addition to outputting the identified risks, the process proceeds to step 419 to report that there is malicious code in the sample. If the threshold is not exceeded, the process flows to step 420 to report the identified risks and indicate that the code sample is not likely to include malicious code.

Process 400 may be refined to look for what appears to be iteration over some block of memory by a decoder, by inventorying the addresses updated by the code under emulation and sorting them, and then, when the instruction limit is hit, extending it by the length of that iteration plus some factor.

Malicious code may be anywhere in the process image. Certain embodiments of the present invention may be adapted to detect return-oriented programming (ROP). In one approach, ROP is detected by deeming some arbitrary part of memory to be the stack (setting the stack pointer accordingly), and kicking off execution by executing a return instruction (predicated upon that stack) instead of starting execution at any specified offset. The effect of this is that if the deemed stack is actually a ROP stack, then the ROP payload will be "executed", which cannot be achieved if the stack pointer is held invariant.

In accordance with at least one embodiment of the invention, the system, apparatus, methods, processes and/or operations described herein may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system. In accordance with another embodiment of the invention, the system, apparatus, methods, processes and/or operations described herein may be wholly or partially implemented in the form of a set of processor executable instructions stored on persistent storage media.

Figure 6:
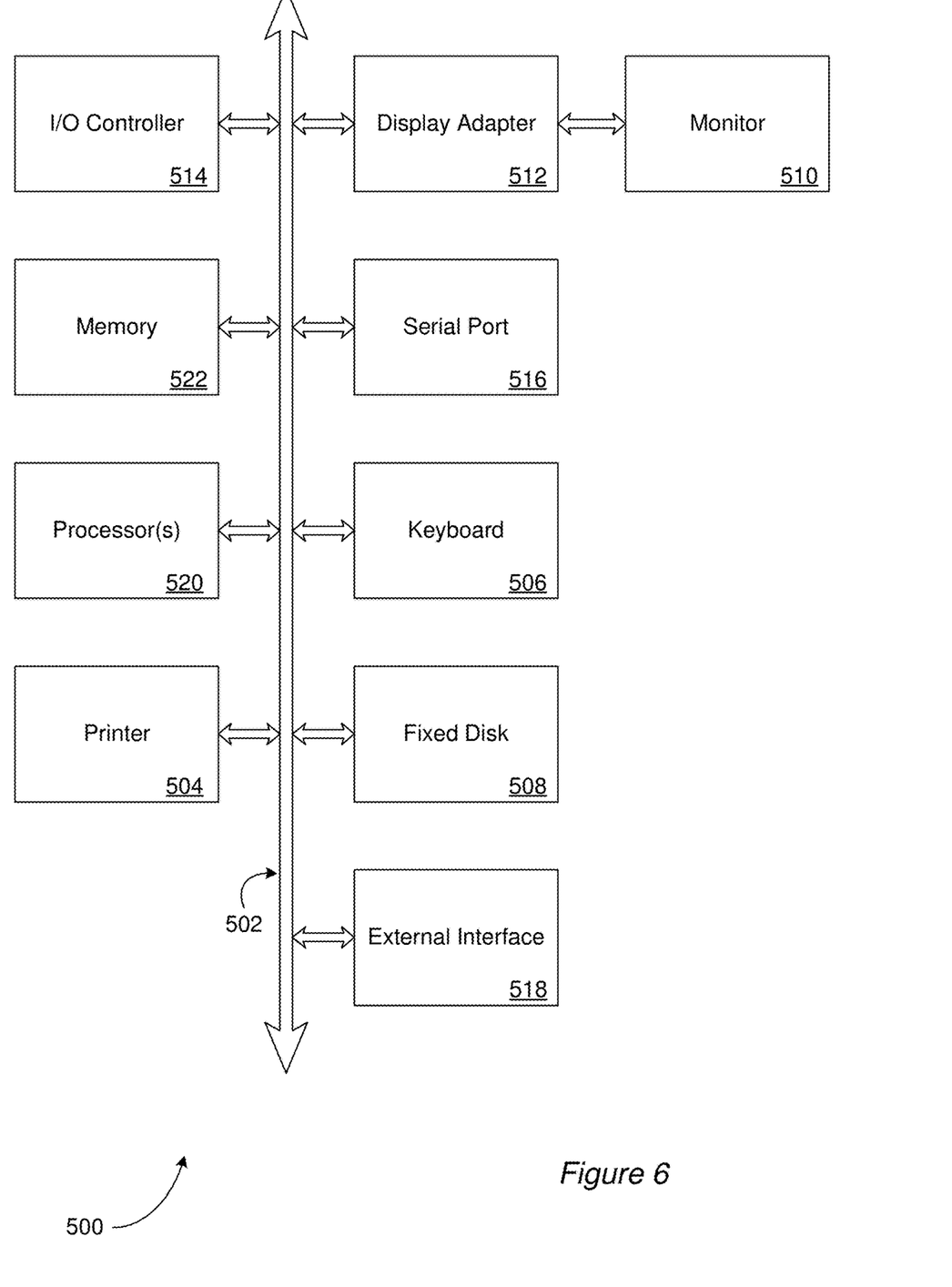
FIG. 6 depicts aspects of elements that may be present in a computer device and/or system configured to implement a method, system and/or process in accordance with some embodiments of the present invention.

FIG. 6 depicts aspects of elements that may be present in one example of a computer device and/or system 500 configured to implement at least some elements of a method, system and/or process in accordance with some embodiments of the present invention. The subsystems shown in FIG. 6 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 6 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components or steps depicted in the drawings or described above, as well as components and steps not shown or described, are possible without departing from the scope of the invention. Similarly, some features and subcombinations are useful and may be employed without reference to other features and subcombinations. Embodiments of the invention have been described for illustrative and not restrictive purposes, and alternative embodiments will be apparent to one of ordinary skill in the art. Accordingly, the present invention is not limited to the embodiments described above or depicted in the drawings, and various embodiments and modifications can be made without departing from the scope of the invention.

We claim:

1. A method for emulating potentially malicious code, the method comprising the steps of:
    emulating a first ring of an operating system;
    emulating a second ring of the operating system, where the second ring has greater access to system resources than the first ring and where the first and second rings are separately emulated;
    executing a code payload in the emulated first ring;
    checking the behavior of the executing code payload for suspect behavior; and
    identifying the code payload as malicious code if suspect behavior is detected.

2. The method of claim 1, where the step of emulating a second ring of the operating system further comprises emulating at least one of operating system and microarchitecture functionality such that the second ring emulation returns results to the executing code payload, but does not actually perform the functionality in a host platform.

3. The method of claim 1, where the step of executing a code payload in the emulated first ring further includes executing the code payload in the emulated first ring at one or more offsets.

4. The method of claim 1, where the step of checking the behavior of the executing code payload for suspect behavior further includes determining the suspect behavior one or more of dynamically, parametrically, and statically.

5. The method of claim 1, where the suspect behavior includes one or more of invocation of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

6. The method of claim 5, where at least some of the suspect behavior is defined by one or more of dynamically, parametrically, or statically.

7. The method of claim 1, where the step of executing a code payload in the emulated first ring further comprises:
    emulating the code payload in a virtual machine; and
    emulating operating system calls and interrupts in a separate layer that does not perform the operating system calls and interrupts, but returns an expected return value to the code payload in order to facilitate continued execution of the code payload.

8. A system for emulating potentially malicious code, the system comprising:
    one or more processors; and
    one or more memory devices in communication with the one or more processors, the memory devices having computer-readable instructions stored thereupon that, when executed by the processors, cause the processors to operate by:
    emulating a first ring of an operating system;
    emulating a second ring of the operating system, where the second ring has greater access to system resources than the first ring and where the first and second rings are separately emulated;
    executing a code payload in the emulated first ring;
    checking the behavior of the executing code payload for suspect behavior; and
    identifying the code payload as malicious code if suspect behavior is detected.

9. The system of claim 8, where the emulating a second ring of the operating system further comprises emulating at least one of operating system and microarchitecture functionality such that the second ring emulation returns results to the executing code payload, but does not actually perform the functionality in a host platform.

10. The system of claim 8, where the executing a code payload in the emulated first ring further includes executing the code payload in the emulated first ring at one or more offsets.

11. The system of claim 8, where the checking the behavior of the executing code payload for suspect behavior further includes determining the suspect behavior one or more of dynamically, parametrically, and statically.

12. The system of claim 8, where the suspect behavior includes one or more of invocation of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

13. The system of claim 12, where at least some of the suspect behavior is defined by one or more of dynamically, parametrically, or statically.

14. The system of claim 8, where the executing a code payload in the emulated first ring further comprises:
    emulating the code payload in a virtual machine; and
    emulating operating system calls and interrupts in a separate layer that does not perform the operating system calls and interrupts, but returns an expected return value to the code payload in order to facilitate continued execution of the code payload.

15. A non-transitory computer readable medium storing computer code configured to a cause a processing device to operate to emulate potentially malicious code, the computer code including instructions that configure the processing device to:
    emulate a first ring of an operating system;
    emulate a second ring of the operating system, where the second ring has greater access to system resources than the first ring and where the first and second rings are separately emulated;
    execute a code payload in the emulated first ring;
    check the behavior of the executing code payload for suspect behavior; and
    identify the code payload as malicious code if suspect behavior is detected.

16. The non-transitory computer readable medium of claim 15, where the instructions configured to cause the processing device to emulate a second ring of the operating system includes instructions to cause the processing device to emulate at least one of operating system and microarchitecture functionality such that the second ring emulation returns results to the executing code payload, but does not actually perform the functionality in a host platform.

17. The non-transitory computer readable medium of claim 15, where the instructions configured to cause the processing device to execute a code payload in the emulated first ring further comprises instructions to cause the processing device to execute the code payload in the emulated first ring at one or more offsets.

18. The non-transitory computer readable medium of claim 15, where the instructions configured to cause the processing device to check the behavior of the executing code payload for suspect behavior further comprise instructions to cause the processing device to determine the suspect behavior one or more of dynamically, parametrically, and statically.

19. The non-transitory computer readable medium of claim 15, the suspect behavior includes one or more of invocation of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

20. The non-transitory computer readable medium of claim 19, where at least some of the suspect behavior is defined by one or more of dynamically, parametrically, or statically.

21. The non-transitory computer readable medium of claim 15, where the instructions configured to cause the processing device to execute a code payload in the emulated first ring further comprises instructions configured to cause the processing device to:
 emulate the code payload in a virtual machine; and
 emulate operating system calls and interrupts in a separate layer that does not perform the operating system calls and interrupts, but returns an expected return value to the code payload in order to facilitate continued execution of the code payload.

* * * * *